T. DOUGLAS.
BEARING.
APPLICATION FILED DEC. 27, 1917.
1,301,664.
Patented Apr. 22, 1919.
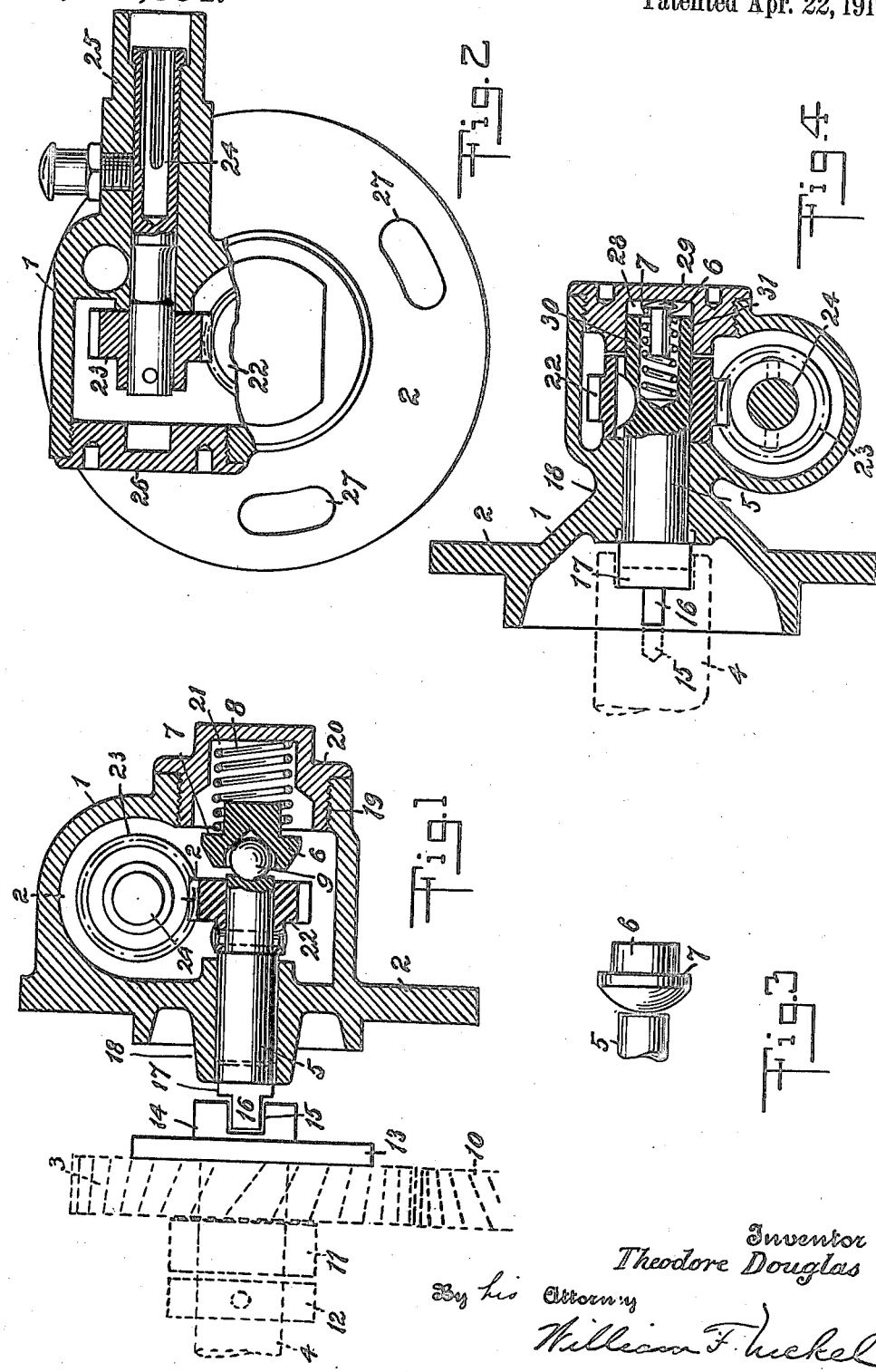

UNITED STATES PATENT OFFICE.

THEODORE DOUGLAS, OF SCARBORO, NEW YORK.

BEARING.

1,301,664.  Specification of Letters Patent.  Patented Apr. 22, 1919.

Application filed December 27, 1917. Serial No. 209,131.

*To all whom it may concern:*

Be it known that I, THEODORE DOUGLAS, a citizen of the United States, residing in Scarboro, in the county of Westchester and State of New York, have invented certain new and useful Improvements in Bearings, of which the following is a specification.

My invention relates to bearings; especially bearings of the thrust type for rotating parts including suitable gearing to receive and impart motion.

The primary object of my invention is to provide a thrust bearing which will take up endwise or axial movement of a shaft to which the bearing is applied; and thus eliminate end play of said shaft in its bearings, and at the same time cause gearing mounted on the shaft to engage noiselessly and run efficiently relative to other gearing with which the gearing on the shaft is intended to operate.

A further object of my invention is to provide a bearing for a pair of shafts to be arranged end to end in axial alinement, and to be put in connection with each other by means of a convenient joint; the bearing serving to assure and maintain efficient connection between the shafts under all possible conditions.

Still another object of my invention is to provide a bearing which will serve the purposes mentioned in the foregoing paragraphs, and yet exert practically no friction tending to retard the rotation of the shafts when the latter are in motion.

The above and other objects and advantages of my invention will more fully appear in the following description, taken in connection with the accompanying drawings forming a part of the same; and the novel features of my invention will be precisely defined in the appended claims. This disclosure, however, is explanatory only, and embodiments of my invention other than what is actually shown herein may be adopted, within the scope and spirit of my invention, to the full extent indicated by the general meanings of the terms in which the claims are expressed.

On the drawings:—

Figure 1 is an axial section showing a bearing made according to my invention applied to act upon a shaft, and showing the manner in which the gearing carried by said shaft is caused to engage other gearing;

Fig. 2 is an end view of the parts shown in Fig. 1, the observer looking at the construction shown in Fig. 1 from the right; Fig. 2 also being partly in section, taken on the line 2—2 in Fig. 1;

Fig. 3 is a detail view showing a modified form of thrust bearing for the same purpose as the bearing shown in Fig. 1; and Fig. 4 is a view similar to Fig. 1 showing another type of thrust bearing made in accordance with my invention.

The same numerals identify the same parts throughout.

In the detailed description of the embodiments of my invention herein set forth I utilize the numeral 1 to indicate a casing having a flange 2 to enable it to be bolted to a suitable support, such as another casing, not shown, but adapted to inclose a transmission element or gear 3 mounted on a shaft 4. In axial alinement with the shaft 4 and operatively conected with same, is a short shaft 5, rotatably carried by the casing 1; and the inner end of this shaft 5 is engaged by the thrust bearing which I seek to protect. This thrust bearing comprises an element such as a plunger or head 6, formed with a shoulder 7 near one end, so that it may be actuated by a suitable spiral spring 8. This spiral spring forces the head 6 toward the inner end of the shaft 5; thus pressing it toward the shaft 4; and the adjacent face of the head 6 is given a recess to receive an antifriction element having a curved surface, such as a ball 9. This ball makes contact with the adjacent end of the shaft 5; and that extremity of the shaft 5 may be provided with a shallow recess to receive the ball 9. The recesses in the adjacent ends of the shaft 5 and head 6 may have any suitable shape so as to make contact with the ball 9 at as few points as possible and thus reduce the friction; these recesses serving to keep the shaft and the bearing head 6 in proper alinement; this bearing head being left unsupported except by its engagement with the ball 9 on one side and the spring 8 on the other.

When the shafts 4 and 5 are in rotation the thrust bearing engaging the inner end of the shaft 5 will serve not only as means for maintaining or securing an efficient operative connection or engagement of the two shafts with each other; but also for preventing either shaft from moving or playing endwise in the bearing or bearings supporting it. The shaft 4, for example, will usually be the half-time or cam shaft of an internal combustion engine and the gear 3 may be connected to the crank shaft of said engine to cause said shaft 4 to rotate. In practice the gear 3 may be a spiral or skew gear, and it will be turned by a similar transmission element or gear 10 on the engine crank shaft, gears of this type being now widely used in such relations because they operate more smoothly and silently than ordinary gear wheels. Such spiral gears, however, owing to the axial component of the reaction due to the thrust of the teeth of these gears against one another, have a marked tendency to push the shaft 4 in the direction of its axis; and this tendency is frequently made stronger by the action of the cams, not shown, on the shaft 4 when the noses of the latter pass the ends of the valve shafts, not shown, which the cams actuate. Hence the shaft 4, under ordinary conditions, moves back and forth in its bearings; and it is this back and forth movement which the thrust bearing engaging the inner end of the shaft 5 tends to eliminate. By a thrust bearing made in accordance with my invention, the tendency of the shaft 4 to reciprocate is counteracted, and the socalled gear-slap of the spiral gear 3 against the adjacent bearing for the shaft 4 as the gear on the crankshaft drives the gear 3 is minimized. This bearing is shown at 11; it is between the gear 3 and a collar 12 on the shaft 4; and the spring 8 presses the gear 3 against the bearing 11 and the collar 12 away from it.

In other words, the shaft 4 is subjected to very uneven pressure in its rotation, as a result of the cams successively reciprocating the valve rods; and the purpose of the spring 8, which operates under a pressure of 20 pounds and up, depending on the engine design, is to take the end-thrust of the shaft 4, which the uneven pressure referred to produces. When the gear 3 is a helical gear, the varying pressure to which the shaft 4 is subjected tends to cause said shaft to move longitudinally or endwise to an even greater extent as the power to drive the shaft increases and decreases; the extent of the endwise movement depending on the construction of the parts and the angle of the spiral or helical teeth. Even though the endwise movement of the shaft is small, it is still very quick, and it produces a distinct noise, technically known as gear slap, which arises from the side of the gear 3 striking against the end of the bearing 11. With the yielding thrust bearing comprising the spring 8, the head 6 and the ball 9, this gear slap is suppressed; and as the shafts 4 and 5 work against the yielding thrust bearing, the side of the gear 3 is kept in constant contact under pressure with the bearing 11. Further, the gears 3 and 10 mesh with each other over their entire axial depth, so that their teeth engage without clashing. Hence noise and lost motion are done away with; because, as a result of the pressure of the spring or yielding means 8, any end movement of the shaft 4 is quickly followed up, and all lateral or radial backlash is eliminated.

To the face of the gear 3 adjacent the casing 1 I secure a plate 13 having a central boss 14 in line with the axis of the shaft 4. This boss 14 has a central opening, such as a slot 15, and it receives a projection 16 of an element 17. This element has its opposite end of any suitable polygonal shape, and entering a slot or recess of corresponding shape in the adjacent end of the shaft 5. The element 17 thus constitutes a suitable joint or coupling providing connection between the shafts 4 and 5; and the thrust bearing which engages the inner end of the shaft 5 not only eliminates endwise movement of the shaft 4 and back-slap of the gear 3, but also secures and maintains the connection between the rotating parts 4 and 5; thus further assuring the proper and efficient transmission of motion between the two shafts. The shaft 5 is carried by a suitable bearing 18 in line with the shaft 4 and located on the side of the casing 1 adjacent the gear 3.

The casing 1 is provided on the side opposite the bearing 18 and in line with this bearing with a suitable threaded opening 19. In this opening is screwed a cap 20 which has an interior recess or pocket 21 providing a seat for the spring 8. The shaft 5 carries between the head 6 and bearing 15 a transmission element or spiral gear 22 riveted to the shaft 5 and meshing with a transmission element or spiral gear 23 carried on the end of a short shaft 24. This short shaft rotates in a suitable bearing 25, the axis of which may make any convenient or desirable angle with the axis of the bearing 18; and in line with the bearing 25 is a threaded opening closed by a cap 26. This cap 26 can be removed by unscrewing same, and access to the gear wheel 23 is thus afforded. Access can also be had to the gear 22 and the thrust bearing at any time by simply unscrewing the cap 20.

In practice the shaft 24 will be connected to the governor of the engine of which gear 3 and shaft 4 are a part, and motion will normally be transmitted from the shaft 4 through the shaft 5 to operate the governor. So far as the bearing engaging the end of the shaft 5 is concerned however, the action of this bearing will be the same whether motion is transmitted from the shaft 4 to the shaft 5 or vice versa.

The flange 1, as shown in Fig. 2 is provided with slots 27 to enable screws to be passed therethrough into suitable openings on the support by which this casing 1 is mounted. These slots are elongated to enable the casing 1 to be angularly adjusted about the axis of the bearing 18.

In Fig. 3 I show a form of thrust bearing in which the ball 9 is omitted, the end of the head 6 being rounded or curved so as to engage the end of the shaft 5 at a single point if the end of the shaft 5 is flattened. If desired, the shaft 5 may be recessed slightly to enable the rounded end of the head 6 to engage it in the same manner as the ball 9 engages the shaft 5 in Fig. 1.

In Fig. 4 I show a type of spring thrust bearing which is to be employed when, for any reason, a lighter spring than the spring shown at 8 in Fig. 1 is required. The shaft 4 is illustrated as being connected to the shaft 5 by a joint very similar to that provided by the element 17 on Fig. 1; but the shaft 5, instead of terminating at its inner end short of the casing, as it does in Fig. 1, has its inner extremity in engagement with a bore 28 provided on the inner face of a cap 29; this cap 29 having screw threaded engagement with an opening in the casing 1 concentric with the axis of the shafts 4 and 5. The extremity of the shaft 5, which enters this bore, is provided with a recess 30 in which is disposed a spring 31. The spring 31 abuts against the bottom or inner end of the recess 30 at one end, and against a shoulder 7 of an element similar to the head 6 shown in Fig. 3. In action the spring keeps the element 6 pressed against the cap 29, which abuts the head 6 and limits its movement under the influence of the spring 8. In the opposite direction the spring 8 presses the shaft 5 toward the shaft 4 and keeps the element 17 in constant mesh with the shaft 4 at one end and the shaft 5 at the other.

While in Fig. 1 the gears 22 and 23 are secured rigidly to the shafts 5 and 24 respectively by riveting their hubs to these shafts, the gear 22 in Fig. 4 is slidably mounted on the shaft 5 by means of a keyway on the inside of the gear and a key carried by the shaft. Endwise movement of this gear is prevented by confining it between one end of the bearing 18 and the cap 29, the other gear 23 being riveted to the shaft 24 the same as before. The pressure of the spring forces the shaft 5 backward through the gear 22 until the connection between the shafts 4 and 5 through the element 17 is properly made. The type of coupling or joint shown in Fig. 4 is well known, as it comprises an element which has oblong or otherwise polygonal portions entering slots in the adjacent ends of the shafts 4 and 5, and thus causes the two shafts to rotate together. However, through inequalities in machining, large variations sometimes occur in the distance between the gear case containing the shaft 4 and the bottom of the slot 15 in the end of this shaft; the casing 1 of course being secured to the outside of the gear case containing the shaft 4, which gear case, as stated, is not shown. Sometimes these variations are so great that the projection 16 of the element 17 will be found to mesh with the slot 15 of the shaft 4 to only a very slight depth. As a result, the strength of the driving member is much reduced, and danger of the element 17 breaking arises in consequence. By the construction shown in Fig. 4 any inequalities or variations between the bottom of the slot 15 and the adjacent face of the gear case containing the shaft is compensated, because the spring 4 will move the shaft 5 back through the gear 22 until the two shafts and the element 17 are in efficient operative relation or engagement with each other.

Of course the spring 8 in Fig. 1 will also press the shaft 5 toward the shaft 4, to secure or maintain a good operative relation between the shaft 5 and the plate 13; in addition to preventing end-play of the gear 3; this spring in every instance pressing the shaft 5 toward the shaft 4, thus exerting pressure on both in the direction of the axis of the two shafts.

In all the forms of my invention it will be seen that the shafts 4 and 5 are connected between the two bearings 11 and 18 and the spring engaging the end of the shaft 5 not only maintains said conection but also serves to keep the gear 3 in proper position with respect to the bearing 11.

Having described my invention, what I claim to be new, and desire to secure and protect by Letters Patent of the United States is as follows:

1. The combination of a pair of shafts having operative connection with each other and means comprising a spring-pressed element and an anti-friction ball mounted therein to engage one of said shafts to impel the same toward the other of said shafts to maintain said connection.

2. The combination of a pair of shafts arranged in axial alinement with each other, said shafts being in operative connection with each other, and means engaging the end of one of said shafts for securing the connection between said shafts.

3. The combination of a pair of shafts arranged in axial alinement and connected together, and means comprising a spring-pressed element and an anti-friction ball mounted therein to engage the end of one of said shafts and exert pressure thereon in the direction of the axis of the same toward the other shaft.

4. The combination of a pair of shafts, a bearing for each of said shafts, said shafts being operatively connected between said bearings, and means engaging one of said shafts to maintain the same in efficient operative connection with the other shaft.

5. The combination of a pair of shafts, a bearing for each of said shafts, said shafts being operatively connected between said bearings, a transmission element mounted on one of said shafts, and means engaging one of said shafts to maintain said element in proper position relative to the bearing for the shaft having said element thereon.

6. The combination of a pair of shafts, a bearing for each of said shafts, said shafts being operatively connected between said bearings, a transmission element on one of said shafts, and means engaging one of said shafts for maintaining the efficiency of said connection and maintaining the element in proper position relative to the bearing for the shaft carrying said element.

7. The combination of a shaft, a transmission element thereon, a bearing for said shaft, and means for maintaining the element in proper relation to the bearing.

8. The combination of a shaft, a transmission element thereon, a bearing for the shaft, a second shaft connected to the first shaft and means for maintaining the efficiency of said connection and maintaining the element in proper relation to the bearing.

In testimony whereof, I have signed my name to this specification this 4th day of December, 1917.

THEODORE DOUGLAS.